US012354528B2

(12) United States Patent
No et al.

(10) Patent No.: US 12,354,528 B2
(45) Date of Patent: Jul. 8, 2025

(54) DISPLAY PANEL AND DISPLAY DEVICE INCLUDING THE SAME

(71) Applicant: Samsung Display Co., LTD., Yongin-si (KR)

(72) Inventors: Sang Yong No, Yongin-si (KR); Kyungho Kim, Yongin-si (KR); Gichang Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/395,528

(22) Filed: Dec. 23, 2023

(65) Prior Publication Data

US 2024/0331612 A1 Oct. 3, 2024

(30) Foreign Application Priority Data

Mar. 28, 2023 (KR) ........................ 10-2023-0040424

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2300/0861* (2013.01); *G09G 2310/061* (2013.01); *G09G 2310/08* (2013.01); *G09G 2340/0435* (2013.01)

(58) Field of Classification Search
CPC ........................................................ G09G 3/32
See application file for complete search history.

(56) References Cited

U.S. PATENT DOCUMENTS

| | | | | |
|---|---|---|---|---|
| 2020/0394961 | A1* | 12/2020 | Kim | G09G 3/3233 |
| 2022/0139322 | A1* | 5/2022 | Wang | G09G 3/3241 345/690 |
| 2024/0321197 | A1* | 9/2024 | Shang | G09G 3/3266 |

FOREIGN PATENT DOCUMENTS

| | | | |
|---|---|---|---|
| KR | 1020210013475 | A | 2/2021 |
| KR | 1020210013477 | A | 2/2021 |
| KR | 1020210144401 | A | 11/2021 |
| KR | 1020220014373 | A | 2/2022 |
| KR | 1020220079381 | A | 6/2022 |
| KR | 1020220105886 | A | 7/2022 |

* cited by examiner

*Primary Examiner* — Joseph R Haley
(74) *Attorney, Agent, or Firm* — CANTOR COLBURN LLP

(57) ABSTRACT

A display panel includes a first display region to an N-th display region disposed in a row direction. A P-th display region includes a first pixel circuit including a first pixel driving transistor, a first pixel initialization transistor which receives an initialization voltage, and a first pixel compensation transistor connected in series to the first pixel initialization transistor, where the first pixel compensation transistor connects the first pixel driving transistor and the first pixel initialization transistor to each other based on a compensation gate signal, and a P-th region control circuit including a first control transistor which outputs a high gate voltage of the compensation gate signal, and a second control transistor which outputs a low gate voltage of the compensation gate signal, where the first control transistor and the second control transistor are controlled based on a P-th region control signal.

21 Claims, 8 Drawing Sheets

DISPLAY PANEL AND DISPLAY DEVICE INCLUDING THE SAME

This application claims priority to Korean Patent Application No. 10-2023-0040424, filed on Mar. 28, 2023, and all the benefits accruing therefrom under 35 U.S.C. § 119, the content of which in its entirety is herein incorporated by reference.

BACKGROUND

1. Field

Embodiments of the invention relate to a display panel and a display device including the display panel. More particularly, embodiments of the invention relate to a display panel and a display device including the display panel for performing multi-frequency driving (MFD).

2. Description of the Related Art

Generally, a display device includes a display panel and a display panel driver. The display panel may include gate lines, data lines, emission lines and pixels. The display panel driver may include a gate driver for providing gate signals to the gate lines, a data driver for providing data voltages to the data lines, an emission driver for providing emission signals to the emission lines, and a driving controller for controlling the gate driver, the data driver, and the emission driver.

The display device may display an image at a constant driving frequency such as 60 Hz, 120 Hz, or 240 Hz. However, in order to reduce power consumption of the display device, the display device may operate based on a variable frequency by changing time length of a frame every frame. The display device may change the time length of the frame by changing the time length of a blank period. The display device may change the time length of the blank period by controlling the gate signal. In addition, when a still image is not displayed on an entire area of the display panel, that is, when the still image is displayed only on a part of the display panel, the display device may perform multi-frequency driving (MFD) that displays images with different driving frequencies in each of display regions.

SUMMARY

A conventional display device typically operates based on the variable frequency by controlling a gate signal which is applied to each of pixel rows, the conventional display device may control a driving frequency of pixels in a same pixel row. Accordingly, the conventional display device may support the different driving frequencies for the display regions disposed adjacent to each other in a column direction. However, such a conventional display device may not be operable based on the different driving frequencies for the display regions disposed adjacent to each other in a row direction. Also, in order to perform the multi-frequency driving, the conventional display device may be desired to adjust compensation gate signals for controlling compensation transistors included in the pixels and data initialization gate signals for controlling initialization transistors included in the pixels.

Embodiments of the invention provide a display panel for driving display regions disposed adjacent to each other in a row direction at different driving frequencies.

Embodiments of the invention provide a display device including the display panel.

In an embodiment of a display panel according to the invention, the display panel includes a first display region to an N-th display region disposed in a row direction, where N is an integer of 2 or greater. In such an embodiment, a P-th display region, where P is an integer between 1 and N, includes a first pixel circuit including a first pixel driving transistor, a first pixel initialization transistor which receives an initialization voltage, and a first pixel compensation transistor connected in series to the first pixel initialization transistor, where the first pixel compensation transistor connects the first pixel driving transistor and the first pixel initialization transistor to each other based on a compensation gate signal, and a P-th region control circuit including a first control transistor which outputs a high gate voltage of the compensation gate signal, and a second control transistor which outputs a low gate voltage of the compensation gate signal, where the first control transistor and the second control transistor are controlled based on a P-th region control signal.

In an embodiment, the first control transistor may include a gate electrode which receives the P-th region control signal, a first electrode which receives the high gate voltage, and a second electrode connected to a gate electrode of the first pixel compensation transistor, and the second control transistor includes a gate electrode which receives the P-th region control signal, a first electrode which receives the low gate voltage and a second electrode connected to the gate electrode of the first pixel compensation transistor.

In an embodiment, the P-th display region may further include a second pixel circuit, and the second pixel circuit may be disposed adjacent to the first pixel circuit in a same pixel row, and include a second pixel driving transistor, a second pixel initialization transistor which receives the initialization voltage, and a second pixel compensation transistor connected in series to the second pixel initialization transistor, where the second pixel compensation transistor connects the second pixel driving transistor and the second pixel initialization transistor to each other based on the compensation gate signal.

In an embodiment, the first control transistor may include a gate electrode which receives the P-th region control signal, a first electrode which receives the high gate voltage, and a second electrode connected to a gate electrode of the first pixel compensation transistor and a gate electrode of the second pixel compensation transistor, and the second control transistor may include a gate electrode which receives the P-th region control signal, a first electrode which receives the low gate voltage and a second electrode connected to the gate electrode of the first pixel compensating transistor and the gate electrode of the second pixel compensating transistor.

In an embodiment, a data writing operation may be performed one time and a self-scan operation may be performed one time during a frame period when a driving frequency of the display panel is a maximum driving frequency, and the data writing operation may be performed one time and the self-scan operation may be performed at least two times during the frame period when the driving frequency of the display panel is not the maximum driving frequency.

In an embodiment, the first pixel circuit may further include a first pixel light emitting element which receives a first pixel driving current of the first pixel driving transistor, a first pixel write transistor which applies a first pixel data voltage to a first electrode of the first pixel driving transistor, a first pixel first light emitting transistor which transmits a first power voltage to the first electrode of the first pixel driving transistor, a first pixel second light emitting transistor which connects a second electrode of the first pixel driving transistor to an anode electrode of the first pixel light emitting element, a first pixel anode initialization transistor which applies an anode initialization voltage to the anode electrode of the first pixel light emitting element, a first pixel storage capacitor which stores a voltage of a gate electrode of the first pixel driving transistor, and a first pixel hold capacitor which stores a voltage of the first electrode of the first pixel driving transistor.

In an embodiment, the first pixel light emitting element may include the anode electrode connected to a first pixel fourth node and a cathode electrode which receives a second power voltage, the first pixel driving transistor may include the gate electrode connected to a first pixel first node, the first electrode connected to a first pixel second node, and the second electrode connected to a first pixel third node, the first pixel write transistor may include a gate electrode which receives a data write gate signal, a first electrode which receives the first pixel data voltage, and a second electrode connected to the first pixel second node, the first pixel compensation transistor may include a gate electrode which receives a compensation gate signal based on the P-th region control signal, a first electrode connected to the first pixel third node, and a second electrode connected to the first pixel first node, the first pixel initialization transistor may include a gate electrode which receives a data initialization gate signal, a first electrode which receives the initialization voltage, and a second electrode connected to the first pixel third node, the first pixel first light emitting transistor may include a gate electrode which receives an emission signal, a first electrode which receives the first power voltage, and a second electrode connected to the first pixel second node, the first pixel second light emitting transistor may include a gate electrode which receives the emission signal, a first electrode connected to the first pixel third node, and a second electrode connected to the first pixel fourth node, the first pixel anode initialization transistor may include a gate electrode which receives an anode initialization gate signal, a first electrode which receives the anode initialization voltage, and a second electrode connected to the first pixel fourth node, the first pixel storage capacitor may include a first electrode which receives the first power voltage and a second electrode connected to the first pixel first node, and the first pixel hold capacitor may include a first electrode which receives the first power voltage and a second electrode connected to the first pixel second node.

In an embodiment, the data write gate signal may include an M-th data initialization gate signal, and the anode initialization gate signal may be an (M+K)-th data initialization gate signal, where K is an integer of 1 or greater.

In an embodiment, when the data writing operation is performed, each of the data initialization gate signal, the compensation gate signal, the data write gate signal, the anode initialization gate signal, and the emission signal may include at least one turn-on voltage period.

In an embodiment, when the data writing operation is performed, a part of the turn-on voltage period of the data initialization gate signal may overlap a part of the turn-on voltage period of the compensation gate signal.

In an embodiment, when the part of the turn-on voltage period of the data initialization gate signal overlaps with the part of the turn-on voltage period of the compensation gate signal, the voltage of the gate electrode of the first pixel driving transistor may be initialized.

In an embodiment, when the self-scan operation is performed, each of the data write gate signal, the anode initialization gate signal, and the emission signal may include at least one turn-on voltage period, and each of the data initialization gate signal and the compensation gate signal may exclude the turn-on voltage period.

In an embodiment of a display device according to the invention, the display device comprises a display panel including a first display region to an N-th display region disposed in a row direction, where N is an integer of 2 or greater, and a display panel driver which drives the display panel. In such an embodiment, a P-th display region, where P is an integer between 1 and N, includes a first pixel circuit including a first pixel driving transistor, a first pixel initialization transistor which receives an initialization voltage, and a first pixel compensation transistor connected in series to the first pixel initialization transistor, where the first pixel compensation transistor connects the first pixel driving transistor and the first pixel initialization transistor to each other based on a compensation gate signal, and a P-th region control circuit including a first control transistor which outputs a high gate voltage of the compensation gate signal, and a second control transistor which outputs a low gate voltage of the compensation gate signal, where the first control transistor and the second control transistor are controlled based on a P-th region control signal.

In an embodiment, the first control transistor may include a gate electrode which receives the P-th region control signal, a first electrode which receives the high gate voltage, and a second electrode connected to a gate electrode of the first pixel compensation transistor, and the second control transistor may include a gate electrode which receives the P-th region control signal, a first electrode which receives the low gate voltage and a second electrode connected to the gate electrode of the first pixel compensation transistor.

In an embodiment, the P-th display region may further include a second pixel circuit, and the second pixel circuit may be disposed adjacent to the first pixel circuit in a same pixel row, and include a second pixel driving transistor, a second pixel initialization transistor which receives the initialization voltage, and a second pixel compensation transistor connected in series to the second pixel initialization transistor, where the second compensation transistor connects the second pixel driving transistor and the second pixel initialization transistor to each other based on the compensation gate signal.

In an embodiment, the first control transistor may include a gate electrode which receives the P-th region control signal, a first electrode which receives the high gate voltage, and a second electrode connected to a gate electrode of the first pixel compensation transistor and a gate electrode of the second pixel compensation transistor, and the second control transistor may include a gate electrode which receives the P-th region control signal, a first electrode which receives the low gate voltage and a second electrode connected to the gate electrode of the first pixel compensating transistor and the gate electrode of the second pixel compensating transistor.

In an embodiment, a data writing operation may be performed one time and a self-scan operation may be performed one time during a frame period when a driving frequency of the display panel is a maximum driving frequency, and the data writing operation may be performed one time and the self-scan operation may be performed at least two times during the frame period when the driving frequency of the display panel is not the maximum driving frequency.

In an embodiment, the first pixel circuit may further include a first pixel light emitting element which receives a first pixel driving current of the first pixel driving transistor, a first pixel write transistor which applies a first pixel data voltage to a first electrode of the first pixel driving transistor, a first pixel first light emitting transistor which transmits a first power voltage to the first electrode of the first pixel driving transistor, a first pixel second light emitting transistor which connects a second electrode of the first pixel driving transistor to an anode electrode of the first pixel light emitting element, a first pixel anode initialization transistor which applies an anode initialization voltage to the anode electrode of the first pixel light emitting element, a first pixel storage capacitor which stores a voltage of a gate electrode of the first pixel driving transistor, and a first pixel hold capacitor which stores a voltage of the first electrode of the first pixel driving transistor.

In an embodiment, the first pixel light emitting element may include the anode electrode connected to a first pixel fourth node and a cathode electrode which receives a second power voltage, the first pixel driving transistor may include the gate electrode connected to a first pixel first node, the first electrode connected to a first pixel second node, and the second electrode connected to a first pixel third node, the first pixel write transistor may include a gate electrode which receives a data write gate signal, a first electrode which receives the first pixel data voltage, and a second electrode connected to the first pixel second node, the first pixel compensation transistor may include a gate electrode which receives a compensation gate signal based on the P-th region control signal, a first electrode connected to the first pixel third node, and a second electrode connected to the first pixel first node, the first pixel initialization transistor may include a gate electrode which receives a data initialization gate signal, a first electrode which receives the initialization voltage, and a second electrode connected to the first pixel third node, the first pixel first light emitting transistor may include a gate electrode which receives an emission signal, a first electrode which receives the first power voltage, and a second electrode connected to the first pixel second node, the first pixel second light emitting transistor may include a gate electrode which receives the emission signal, a first electrode connected to the first pixel third node, and a second electrode connected to the first pixel fourth node, the first pixel anode initialization transistor may include a gate electrode which receives an anode initialization gate signal, a first electrode which receives the anode initialization voltage, and a second electrode connected to the first pixel fourth node, the first pixel storage capacitor may include a first electrode which receives the first power voltage and a second electrode connected to the first pixel first node, and the first pixel hold capacitor may include a first electrode which receives the first power voltage and a second electrode connected to the first pixel second node.

In an embodiment, the data write gate signal may include an M-th data initialization gate signal, and the anode initialization gate signal may include an (M+K)-th data initialization gate signal, where K is an integer of 1 or greater.

According to embodiments of the display panel and the display device including the display panel, the display panel may include the first display region to the N-th display region disposed in the row direction. In such embodiments, the P-th display region may include the first pixel circuit including the first pixel driving transistor, the first pixel initialization transistor which receives the initialization voltage, where the first pixel compensation transistor connects the first pixel driving transistor and the first pixel initialization transistor to each other based on the compensation gate signal. In such embodiment, the P-th display region may include the first control transistor which outputs the high gate voltage of the compensation gate signal and the second control transistor which outputs the low gate voltage of the compensation gate signal. In such embodiments, the first control transistor and the second control transistor may be controlled based on the P-th region control signal. Accordingly, the display device may drive the display regions disposed adjacent to each other in the row direction with different driving frequencies, respectively.

In such embodiments, the first pixel compensation transistor may be connected in series to the first pixel initialization transistor. Accordingly, the display device may adjust the compensation gate signal based on the P-th region control signal to drive the display regions disposed adjacent to each other in the row direction with different driving frequencies, respectively.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
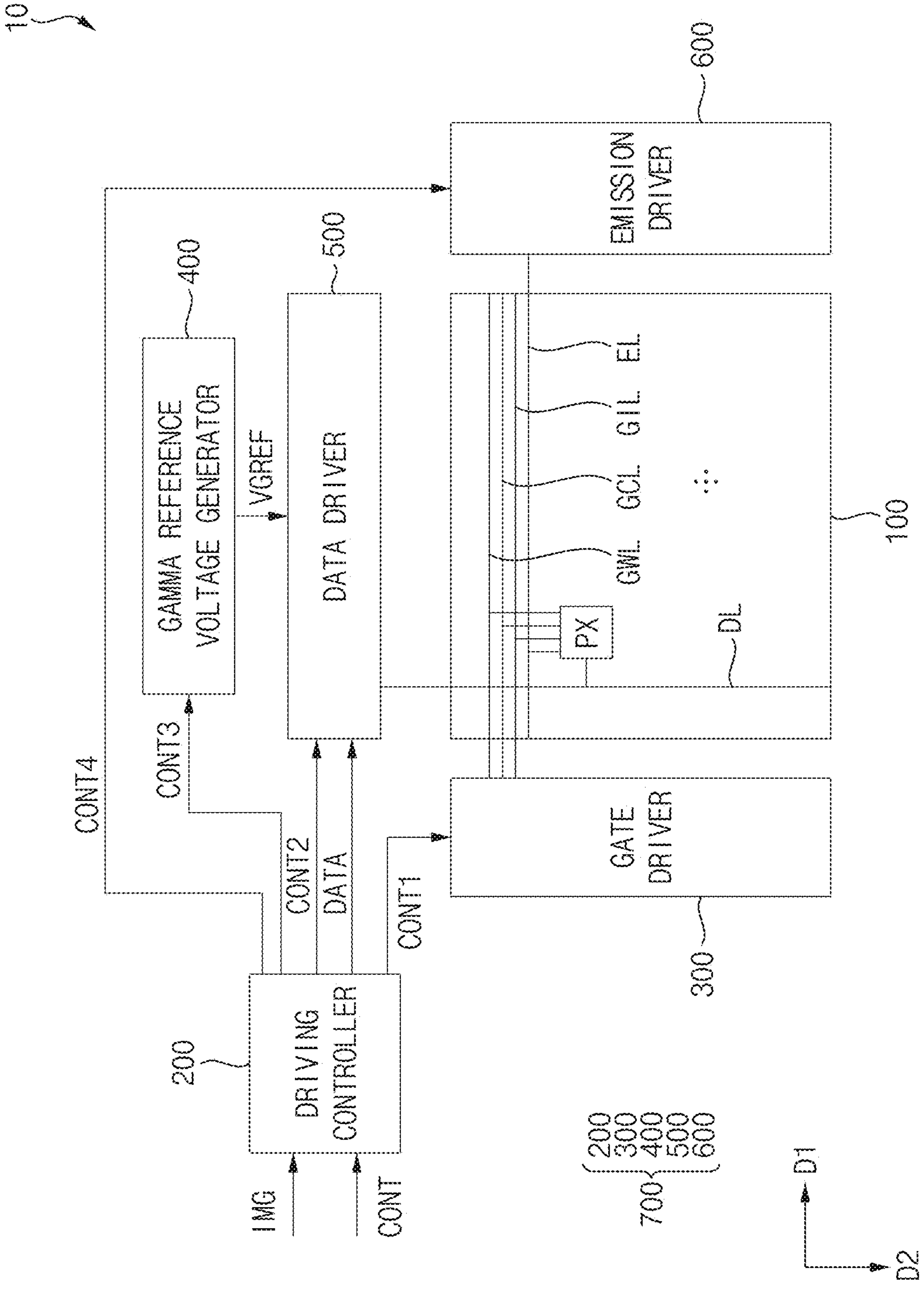
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in more detail with reference to the accompanying drawings.

Figure 2:
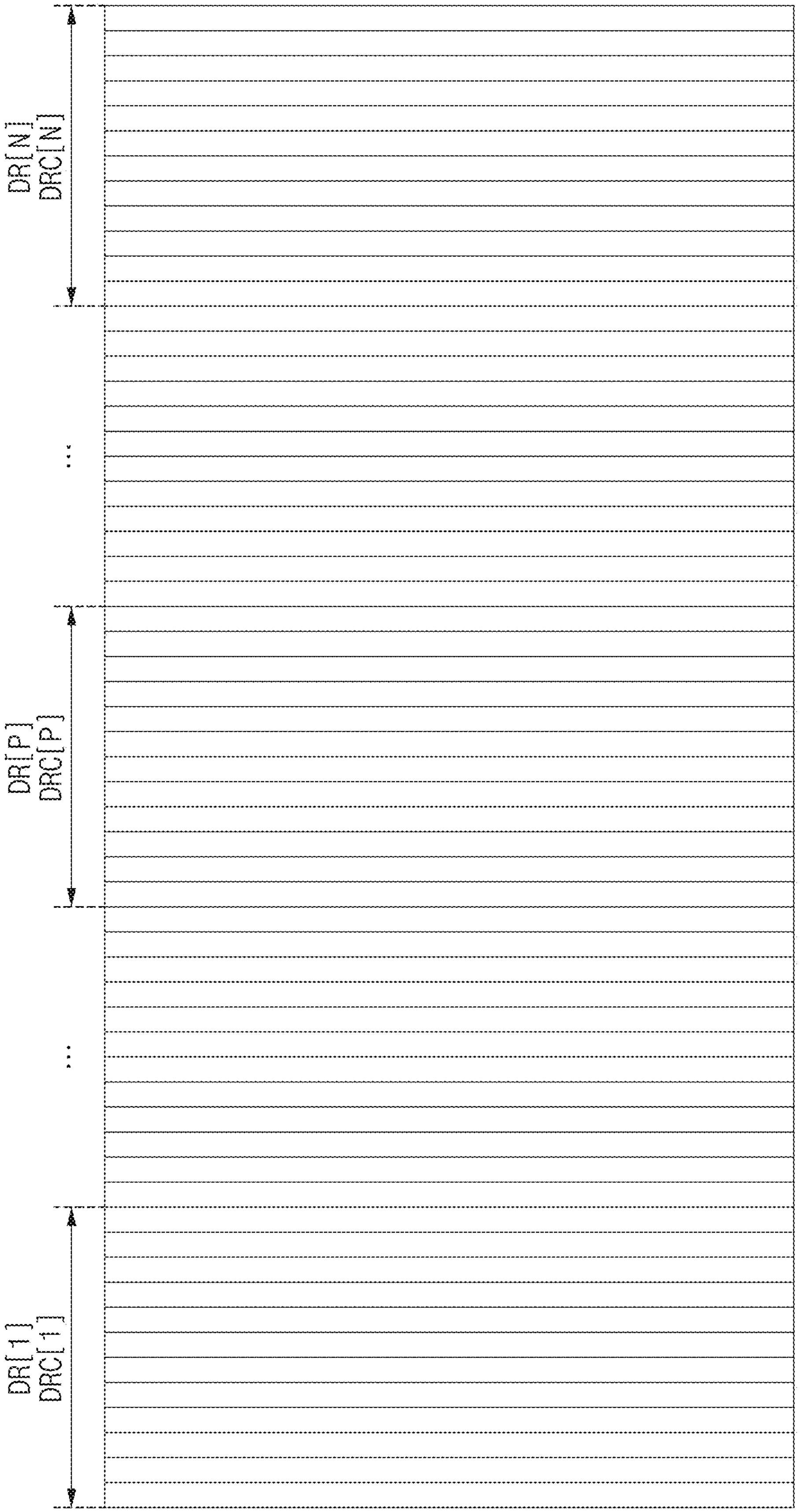
FIG. 2 is a block diagram illustrating an example of a display panel including a first display region to an N-th display region.

FIG. 1 is a block diagram illustrating a display device 10 according to an embodiment. FIG. 2 is a block diagram illustrating an example of a display panel 100 including a first display region DR[1] to an N-th display region DR[N].

Referring to FIGS. 1 and 2, an embodiment of the display device 10 may include a display panel 100 and a display panel driver 700. The display panel driver 700 may include a driving controller 200, a gate driver 300, a gamma reference voltage generator 400, a data driver 500, and an emission driver 600.

In an embodiment, for example, the driving controller 200 and the data driver 500 may be integrally formed with each other. In an alternative embodiment, for example, the driving controller 200, the gamma reference voltage generator 400, and the data driver 500 may be integrally formed with each other (e.g., integrally formed as a single module or circuit). In an alternative embodiment, for example, the driving controller 200, the gate driver 300, the gamma reference voltage generator 400, and the data driver 500 may be integrally formed with each other. In an alternative embodiment, for example, the driving controller 200, the gate driver 300, the gamma reference voltage generator 400, the data driver 500, and the emission driver 600 may be integrally formed with each other. A driving module in which at least the driving controller 200 and the data driver 500 are integrally formed may be referred to as a timing controller embedded data driver (TED).

The display panel 100 may include a display portion configured to display an image and a peripheral portion disposed adjacent to the display portion.

In an embodiment, for example, the display panel 100 may be an organic light emitting diode display panel including an organic light emitting diode. In an alternative embodiment, for example, the display panel 100 may be a quantum-dot organic light emitting diode display panel including an organic light emitting diode and a quantum-dot color filter. In an alternative embodiment, for example, the display panel 100 may be a quantum-dot nano-light emitting diode display panel including a nano-light emitting diode and a quantum-dot color filter. In an alternative embodiment, for example, the display panel 100 may be a liquid crystal display panel including a liquid crystal layer.

The display panel 100 may include gate lines GIL, GCL and GWL, data lines DL, emission lines EL, and pixels P electrically connected to the gate lines GTL, GCL and GWL, the data lines DL, and the emission lines EL. The gate lines GIL, GCL and GWL may extend in a first direction D1, and the data lines DL may extend in a second direction D2 crossing the first direction D1.

In an embodiment, as shown in FIG. 2, the display panel 100 may include a first display region DR[1] to an N-th display region DR[N] (where N is an integer of 2 or greater). The first display region DR[1] to the N-th display region DR[N] may be disposed based on the first direction D1 (i.e., a row direction). In an embodiment, each of the first display region DR[1] to the N-th display region DR[N] may extend in the second direction D1 and the first display region DR[1] to the N-th display region DR[N] may be sequentially arranged in the first direction D1. The display panel 100 may perform a multi-frequency driving (MFD) in which the display regions are driven at different driving frequencies, respectively. For example, the display panel 100 may be driven at a first driving frequency in the first display region DR[1]. For example, the display panel 100 may be driven at a second driving frequency in the second display region DR[2]. For example, the display panel 100 may be driven at an N-th driving frequency in the N-th display region DR[N].

Referring back to FIG. 1, the driving controller 200 may receive input image data IMG and an input control signal CONT from an external device. In an embodiment, for example, the input image data IMG may include red image data, green image data, and blue image data. According to an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 configured to control an operation of the gate driver 300 based on the input control signal CONT and output the first control signal to the gate driver 300. The first control signal CONT1 may include a vertical start signal and a gate clock signal.

The driving controller 200 generates the second control signal CONT2 configured to control an operation of the data driver 500 based on the input control signal CONT and outputs the second control signal to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 configured to control an operation of the gamma reference voltage generator 400 based on the input control signal CONT and output the third control signal to the gamma reference voltage generator 400.

The driving controller 200 may generate the fourth control signal CONT4 configured to control an operation of the emission driver 600 based on the input control signal CONT and output the fourth control signal to the emission driver 600.

The driving controller 200 may generate a first display region control signal DRC[1] to an N-th display region control signal DRC[N] (where N is an integer of 2 or greater), which are configured to control a first frequency to an N-th frequency, respectively, based on the input control signal CONT, and output the generated display region control signals to the first display region DR[1] to the N-th display region DR[N] as shown in FIG. 2.

The gate driver 300 may generate gate signals configured to drive the gate lines GIL, GCL and GWL in response to the first control signal CONT1 received from the driving controller 200. The gate driver 300 may output the gate signals to the gate lines GIL, GCL and GWL.

In an embodiment, the gate driver 300 may be integrated on a peripheral portion of the display panel.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into an analog type data voltage by using the gamma reference voltage VGREF. The data driver 500 may output the data voltage to the data line DL.

The emission driver 600 may generate emission signals configured to drive the emission lines EL in response to the fourth control signal CONT4 received from the driving controller 200. The emission driver 600 may output the emission signals to the emission lines EL.

Figure 3:
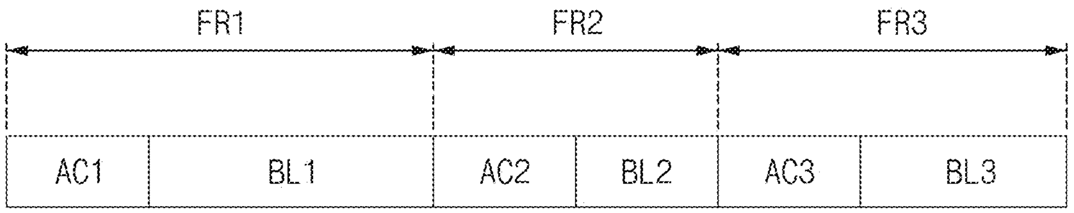
FIG. 3 is a conceptual diagram illustrating a driving frequency of the display panel 100 of FIG. 2.

FIG. 3 is a conceptual diagram illustrating a driving frequency of the display panel 100 of FIG. 2.

Referring to FIGS. 1 to 3, an embodiment of the display panel 100 may be driven at a variable frequency. A first frame FR1 having a first driving frequency may include a first active period AC1 and a first blank period BL1. A second frame FR2 having a second driving frequency different from the first driving frequency may include a second active period AC2 and a second blank period BL2. A third frame FR3 having a third driving frequency different from the first driving frequency and the second driving frequency may include a third active period AC3 and a third blank period BL3.

The first active period AC1 may have a length the same as that of the second active period AC2, and the first blank period BL1 may have a length different from that of the second blank period BL2.

The second active period AC2 may have a length the same as that of the third active period AC3, and the second blank period BL2 may have a length different from that of the third blank period BL3.

The display device supporting the variable frequency may include a data writing period in which a data voltage is written to a pixel and a self-scan period in which the data voltage is not written to the pixel and only light is emitted. The data writing period may be disposed in the active periods AC1, AC2 and AC3. The self-scan period may be disposed in the blank periods BL1, BL2, and BL3.

Figure 4:
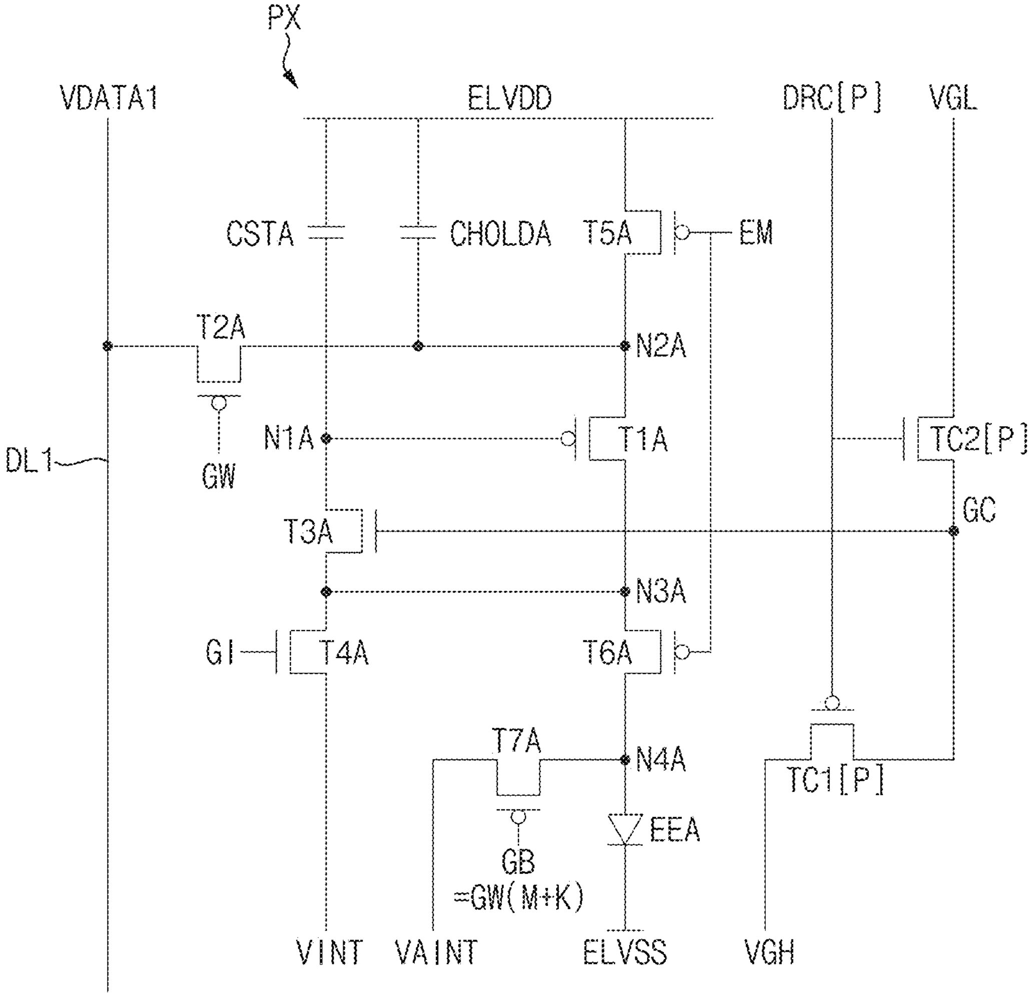
FIG. 4 is a circuit diagram illustrating a first pixel circuit and a P-th display region control circuit in a P-th display region of FIG. 2.
Figure 5:
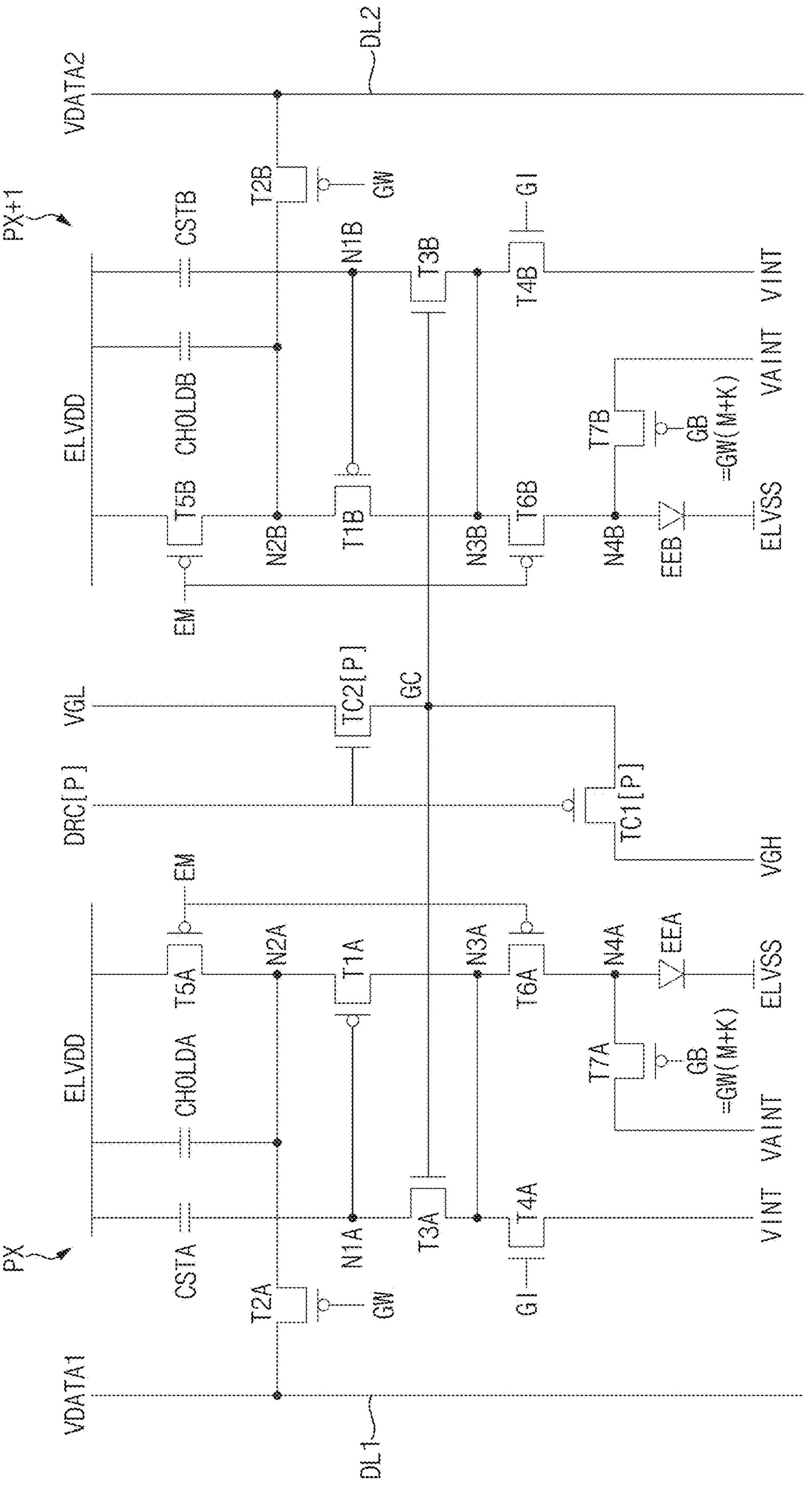
FIG. 5 is a circuit diagram illustrating a first pixel circuit, a second pixel circuit, and a P-th display region control circuit in the P-th display region of FIG. 2.

FIG. 4 is a circuit diagram illustrating a first pixel circuit PX and a P-th display region control circuit TC1[P] and TC2[P] in a P-th display region DR[P] of FIG. 2. FIG. 5 is a circuit diagram illustrating a first pixel circuit, a second pixel circuit, and a P-th display region control circuit in the P-th display region of FIG. 2.

Referring to FIGS. 1 to 5, in a P-th display region DR[P] (where P is an integer between 1 and N), as shown in FIG. 4, may include a first pixel circuit PX and a P-th display region control circuit TC1[P] and TC2[P] that applies a compensation gate signal GC to a gate electrode of a first pixel compensation transistor T3A of the first pixel circuit PX based on a P-th region control signal DRC[P] (where P is an integer between 1 and N). In an embodiment, in the P-th display region DR[P], as shown in FIG. 5, may further include a second pixel circuit PX+1, and the P-th display region control circuit TC1[P] and TC2[P] may apply the compensation gate signal GC to the gate electrode of the first pixel compensation transistor T3A of the first pixel circuit PX and a gate electrode of a second pixel compensation transistor T3B of the second pixel circuit PX+1 based on the P-th region control signal DRC[P]. The display panel of FIG. 4 is substantially the same as the display panel of FIG. 5, except that the display panel of FIG. 4 is connected to one pixel circuit per one display region control circuit in a same pixel row of the P-th display region DR[P], and the display panel of FIG. 5 is connected to a plurality of pixel circuits per one display region control circuit in a same pixel row of the P-th display region DR[P]. In an alternative embodiment, for example, in a same pixel row of the P-th display region DR[P], each one region control circuit may be connected to three pixel circuits. In an alternative embodiment, for example, in the same pixel row of the P-th display region DR[P], each one region control circuit may be connected to four pixel circuits. In an alternative embodiment, for example, in a same pixel row of the P-th display region DR[P], one region control circuit may be connected to all pixel circuits in a same pixel row of the P-th display region DR[P]. Hereinafter, for convenience of description, the embodiment of the display panel of FIG. 5 will be described in detail.

The P-th display region control circuit TC1[P] and TC2[P] may apply a compensation gate signal to a gate electrode of a first pixel driving transistor T1A and/or a gate electrode of a second pixel driving transistor T1B.

In an embodiment, the first pixel circuit PX and the second pixel circuit PX+1 may be disposed adjacent to each other in the P-th display region DR[P] and in a same pixel row, that is, receive a same gate signal as each other.

The first pixel circuit PX may include a first pixel driving transistor T1A, a first pixel initialization transistor T4A configured to receive (or that receives) an initialization voltage VINT, and a first pixel compensation transistor T3A connected in series to the first pixel initialization transistor T4A and connecting the first pixel driving transistor T1A and the first pixel initialization transistor T4A to each other based on a compensation gate signal GC.

The first pixel driving transistor T1A may include a gate electrode connected to a first pixel first node N1A, a first electrode connected to a first pixel second node N2A, and a second electrode connected to a first pixel third node N3A.

The first pixel compensation transistor T3A may include a gate electrode configured to receive a compensation gate signal GC based on the P-th region control signal DRC[P], a first electrode connected to the first pixel third node N3A, and a second electrode connected to the first pixel first node N1A.

The first pixel initialization transistor T4A may include a gate electrode configured to receive a data initialization gate signal GI, a first electrode configured to receive the initialization voltage VINT, and a second electrode connected to the first pixel third node N3A.

The first pixel circuit PX may further include a first pixel light emitting element EEA configured to receive a first pixel driving current of the first pixel driving transistor T1A, a first pixel write transistor T2A configured to apply a first pixel data voltage VDATA1 to the first electrode of the first pixel driving transistor T1A, a first pixel first light emitting transistor T5A configured to transmit a first power voltage ELVDD to the first electrode of the first pixel driving transistor T1A, a first pixel second light emitting transistor T6A configured to connect the second electrode of the first pixel driving transistor TIA to an anode electrode of the first pixel light emitting element EEA, a first pixel anode initialization transistor T7A configured to apply an anode initialization voltage VAINT to the anode electrode of the first pixel light emitting element EEA, a first pixel storage capacitor CSTA configured to store a voltage of the gate electrode of the first pixel driving transistor TIA, and a first pixel hold capacitor CHLDA configured to store a first voltage of the first electrode of the first pixel driving transistor TIA.

The first pixel light emitting element EEA may include the anode electrode connected to a first pixel fourth node N4A and a cathode electrode configured to receive a second power voltage ELVSS.

The first pixel write transistor T2A may include a gate electrode configured to receive a data write gate signal GW, a first electrode configured to receive the first pixel data voltage VDATA1, and a second electrode connected to the first pixel second node N2A.

The first pixel first light emitting transistor T5A may include a gate electrode configured to receive an emission signal EM, a first electrode configured to receive the first power voltage ELVDD, and a second electrode connected to the first pixel second node N2A.

The first pixel second light emitting transistor T6A may include a gate electrode configured to receive the emission signal EM, a first electrode connected to the first pixel third node N3A, and a second electrode connected to the first pixel fourth node N4A.

The first pixel anode initialization transistor T7A may include a gate electrode configured to receive an anode initialization gate signal GB, a first electrode configured to receive the anode initialization voltage VAINT, and a second electrode connected to the first pixel fourth node N4A.

In an embodiment, the first pixel driving transistor T1A, the first pixel write transistor T2A, the first pixel first light emitting transistor T5A, the first pixel second light emitting transistor T6A, and the first pixel anode initialization transistor T7A may be P-type transistors. In an embodiment, the first pixel compensation transistor T3A and the first pixel initialization transistor T4A may be N-type transistors.

The first pixel storage capacitor CSTA may include a first electrode configured to receive the first power voltage ELVDD and a second electrode connected to the first pixel first node N1A.

The first pixel hold capacitor CHOLDA may include a first electrode configured to receive the first power voltage ELVDD and a second electrode connected to the first pixel second node N2A.

In an embodiment, the data write gate signal GW[M] may be an M-th data initialization gate signal, and the anode initialization gate signal GB[M] may be an (M+K)-th data initialization gate signal (where K is an integer of 1 or greater). In an embodiment, for example, K may be 1.

The second pixel circuit PX+1 may include a second pixel driving transistor T1B, a second pixel initialization transistor T4B configured to receive the initialization voltage VINT, and a second pixel compensation transistor T3B connected in series to the second pixel initialization transistor T4B to connect the second pixel driving transistor T1B and the second pixel initialization transistor T4B based on the compensation gate signal GC.

The second pixel driving transistor T1B may include a gate electrode connected to a second pixel first node N1B, a first electrode connected to a second pixel second node N2B, and a second electrode connected to a second pixel third node N3B.

The second pixel compensation transistor T3B may include a gate electrode configured to receive the compensation gate signal GC based on the P-th region control signal DRC[P], a first electrode connected to the second pixel third node N3B, and a second electrode connected to the second pixel first node N1B.

The second pixel initialization transistor T4B may include a gate electrode configured to receive the data initialization gate signal GI, a first electrode configured to receive the initialization voltage VINT, and a second electrode connected to the second pixel third node N3B.

The second pixel circuit PX+1 may further include a second pixel light emitting element EEB configured to receive a second pixel driving current of the second pixel driving transistor T1B, a second pixel write transistor T2B configured to apply a second pixel data voltage VDATA2 to the first electrode of the second pixel driving transistor T1B, a second pixel first light emitting transistor T5B configured to transmit the first power voltage ELVDD to the first electrode of the second pixel driving transistor T1B, a second pixel second light emitting transistor T6B configured to connect the second electrode of the second pixel driving transistor T1B to an anode electrode of the second pixel light emitting element EEB, a second pixel anode initialization transistor T7B configured to apply an anode initialization voltage VAINT to the anode electrode of the second pixel light emitting element EEB, a second pixel storage capacitor CSTB configured to store a voltage of the gate electrode of the second pixel driving transistor T1B, and a second pixel hold capacitor CHOLDB configured to store a voltage of the first electrode of the second pixel driving transistor T1B.

The second pixel light emitting element EEB may include the anode electrode connected to a second pixel fourth node N4B and a cathode electrode configured to receive the second power voltage ELVSS.

The second pixel write transistor T2B may include a gate electrode configured to receive the data write gate signal GW, a first electrode configured to receive the second pixel data voltage VDATA2, and a second electrode connected to the second pixel second node N2B.

The second pixel first light emitting transistor T5B may include a gate electrode configured to receive the emission signal EM, a first electrode configured to receive the first power voltage ELVDD, and a second electrode connected to the second pixel second node N2B.

The second pixel second light emitting transistor T6B may include a gate electrode configured to receive the emission signal EM, a first electrode connected to the second pixel third node N3B, and a second electrode connected to the second pixel fourth node N4B.

The second pixel anode initialization transistor T7B may include a gate electrode configured to receive the anode initialization gate signal GB, a first electrode configured to receive the anode initialization voltage VAINT, and a second electrode connected to the second pixel fourth node N4B.

In an embodiment, the second pixel driving transistor T1B, the second pixel write transistor T2B, the second pixel first light emitting transistor T5B, the second pixel second light emitting transistor T6B, and the second pixel anode initialization transistor T7B may be P-type transistors. In such an embodiment, the second pixel compensation transistor T3B and the second pixel initialization transistor T4B may be N-type transistors.

The second pixel storage capacitor CSTB may include a first electrode configured to receive the first power voltage ELVDD and a second electrode connected to the second pixel first node N1B.

The second pixel hold capacitor CHOLDB may include a first electrode configured to receive the first power voltage ELVDD and a second electrode connected to the second pixel second node N2B.

The P-th display region control circuit TC1[P] and TC2[P] may include a first control transistor TC1[P] including a gate electrode configured to receive the P-th region control signal DRC[P], a first electrode configured to receive a high gate voltage VGH, and a second electrode connected to the gate electrode of the first pixel compensation transistor T3A and the gate electrode of the second pixel compensation transistor T3B, and a second control transistor TC2[P] including a gate electrode configured to receive the P-th region control signal DRC[P], a first electrode configured to receive a low gate voltage VGL, and a second electrode connected to the gate electrode of the first pixel compensation transistor T3A and the gate electrode of the second pixel compensation transistor T3B.

In an embodiment, the first control transistor TC1[P] may be a P-type transistor, and the second control transistor TC2[P] may be an N-type transistor. Alternatively, the first control transistor TC1[P] may be an N-type transistor, and the second control transistor TC2[P] may be a P-type transistor.

In an embodiment, as described above, the P-th display region control circuit TC1[P] and TC2[P] may output the compensation gate signal GC to the gate electrode of the first pixel compensation transistor T3A and the gate electrode of the second pixel compensation transistor T3B based on the P-th region control signal DRC[P].

Figure 6:
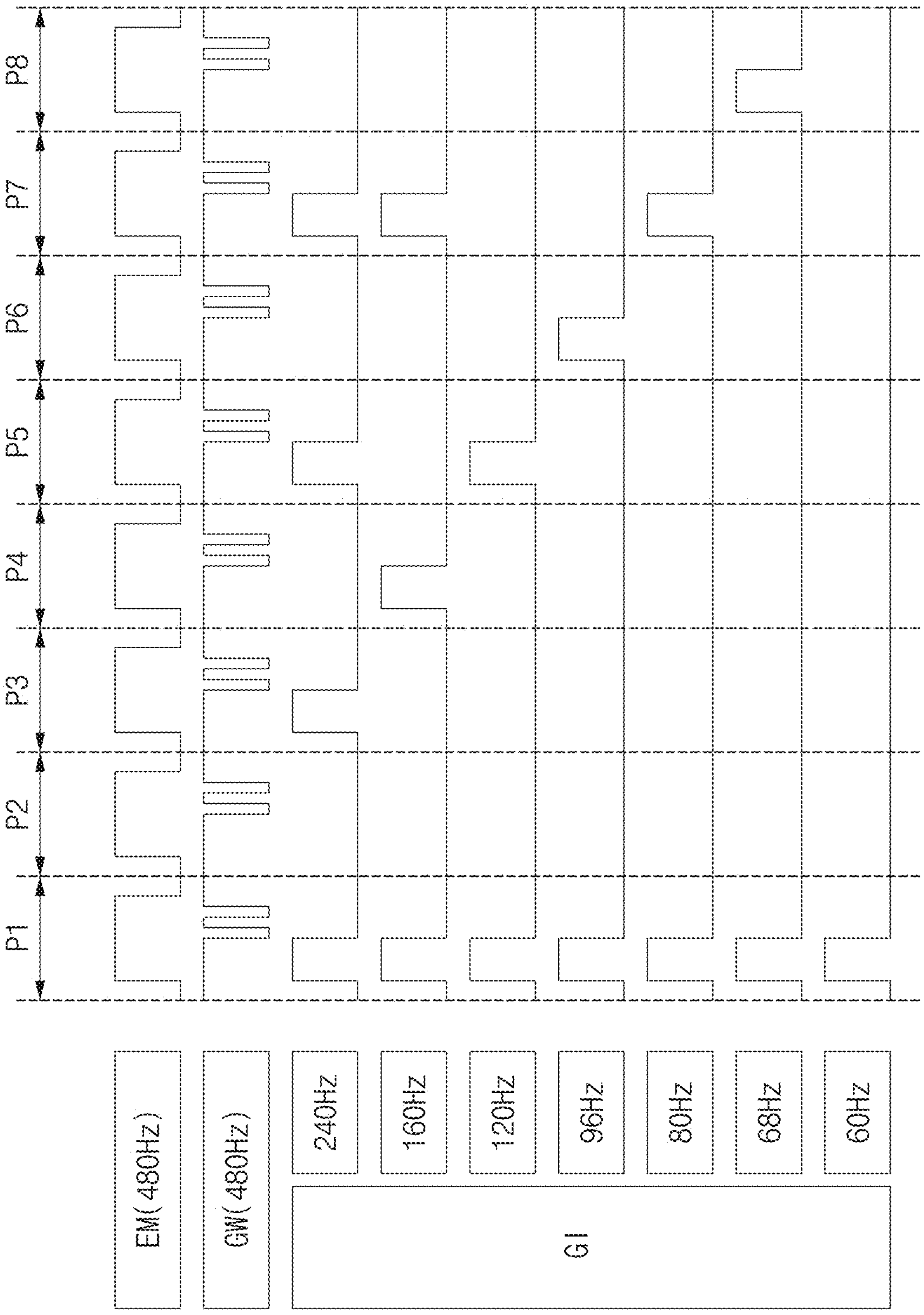
FIG. 6 is a timing diagram illustrating a driving signal of the pixel of FIGS. 4 and 5 when the driving frequency of the display panel 100 is 240 Hz.

FIG. 6 is a timing diagram illustrating a driving signal of the pixel P of FIGS. 4 and 5 when the driving frequency of the display panel 100 is 240 Hz.

The timing diagram of the gate signals of the first pixel circuit PX and the timing diagram of the gate signals of the second pixel circuit PX+1 are substantially the same as each other. Therefore, the timing diagram of the gate signals of the first pixel circuit PX will be described as an example, and the timing diagram of the gate signals of the second pixel circuit PX+1 is omitted for convenience of illustration and description.

In an embodiment, when the driving frequency of the display panel 100 is the maximum driving frequency, one time of data writing operation and one time of self-scan operation may be performed during a frame period, and when the driving frequency of the display panel 100 is not the maximum driving frequency, one time of data writing operation and at least two times of self-scan operation may be performed during frame period.

As shown in FIG. 6, the display panel 100 may be driven at a variable frequency, for example, driven at a maximum of 240 Hz. When the display panel 100 is driven at 240 Hz, a light emitting operation of the first pixel light emitting element EEA may be performed at 480 Hz, a threshold voltage compensation operation of the first pixel driving transistor T1A may be performed at 240 Hz, an initialization operation of the anode electrode of the first pixel light emitting element EEA may be performed at 240 Hz, and an initialization operation of the gate electrode of the first pixel driving transistor T1A may be performed at 240 Hz.

When the display panel 100 is driven at 240 Hz, the data write gate signal GW and the anode initialization gate signal GB may have an active pulse in each of a first period P1 to an eighth period P8. Here, each of the first period P1 to the eighth period P8 may be a period of the light emitting operation of a pixel, which is a half of a frame period of the display panel when driven at the maximum driving frequency. Accordingly, in such an embodiment, when the display panel 100 is driven at 240 Hz, the data initialization gate signal GI and the compensation gate signal GC may have an active pulse only in the first period P1, the third period P3, the fifth period P5 and the seventh period P7. Therefore, the data writing operation may be performed only in the first period P1, the third period P3, the fifth period P5 and the seventh period P7.

In an embodiment, as described above, when the display panel 100 is driven at 240 Hz and the light emitting operation is driven at 480 Hz, it may be said that the display panel 100 operates at 2 cycles.

When the display panel 100 is driven at 120 Hz, the light emitting operation of the first pixel light emitting element EEA may be performed at 480 Hz, the threshold voltage compensation operation of the first pixel driving transistor T1A may be performed at 120 Hz, the initialization operation of the anode electrode of the first pixel light emitting element EEA may be performed at 120 Hz, and the initialization operation of the gate electrode of the first pixel driving transistor T1A may be performed at 120 Hz.

When the display panel 100 is driven at 120 Hz, the data write gate signal GW and the anode initialization gate signal GB may have an active pulse in each of the first period P1 to the eighth period P8. However, the data initialization gate signal GI and the compensation gate signal GC may have an active pulse only in the first period P1 and the fifth period P5. Therefore, the data writing operation may be performed only in the first period P1 and the fifth period P5.

In such an embodiment, as described above, when the display panel 100 is driven at 120 Hz and the light emitting operation is driven at 480 Hz, it may be said that the display panel 100 operates at 4 cycles.

Figure 7:
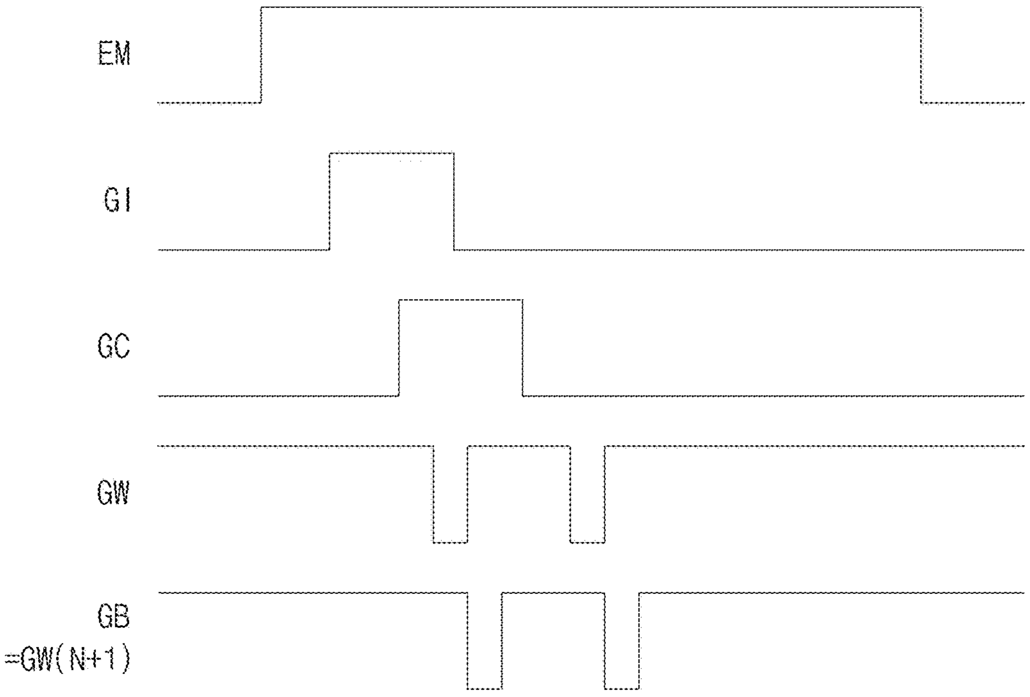
FIG. 7 is a timing diagram illustrating an example of a gate signal in a data writing period.
Figure 8:
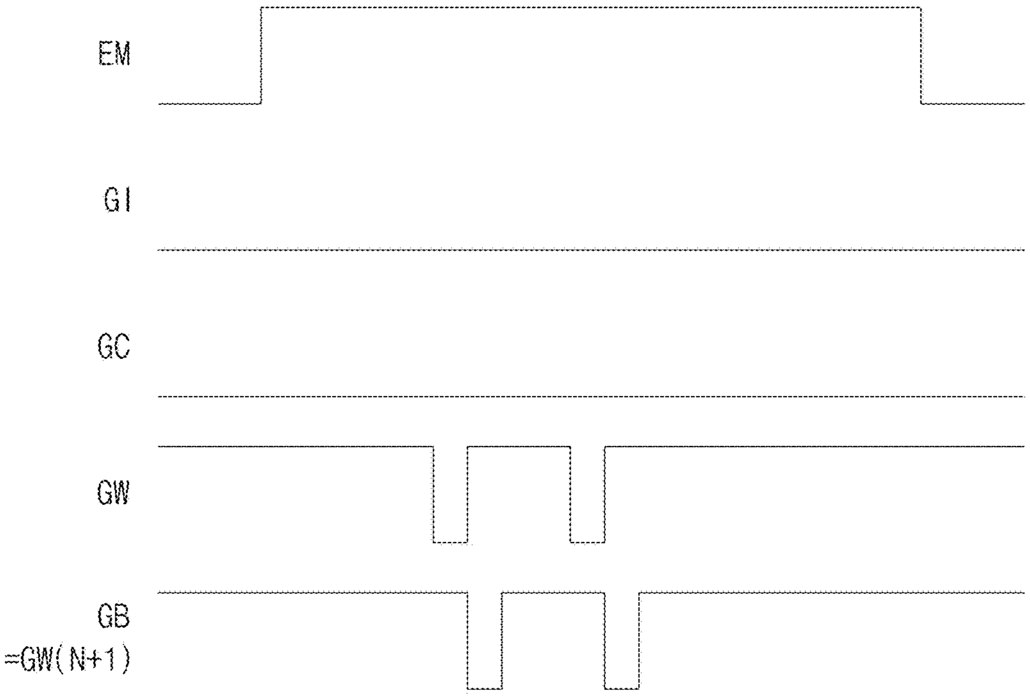
FIG. 8 is a timing diagram illustrating an example of gate signals in a self-scan period.

FIG. 7 is a timing diagram illustrating an example of a gate signal in a data writing period. FIG. 8 is a timing diagram illustrating an example of gate signals in a self-scan period.

Referring to FIGS. 1 to 8, the display device 10 supporting (or operable in) a variable frequency may include a data writing period in which a data voltage is written to a pixel and a self-scan period in which the data voltage is not written to the pixel and only light is emitted.

In an embodiment, as shown in FIG. 7, when the data writing operation is performed, each of the data initialization gate signal GI, the compensation gate signal GC, the data writing gate signal GW, the anode initialization gate signal GB, and the emission signal EM may include at least one turn-on voltage period.

Since the first pixel first light emitting transistor T5A and the first pixel second light emitting transistor T6A are turned off in a period in which the emission signal EM has an inactive level, the first pixel light emitting element EEA may not emit light. When the emission signal EM is changed to the active level, the first pixel first light emitting transistor T5A and the first pixel second light emitting transistor T6A are turned on such that the first pixel light emitting element EEA may emit light.

The data initialization gate signal GI may be applied to the gate electrode of the first pixel initialization transistor T4A. Since the first pixel initialization transistor T4A is turned on when the data initialization gate signal GI is at the active level, the initialization voltage VINT may be applied to the second electrode of the first pixel driving transistor TIA through the first pixel initialization transistor T4A.

The compensation gate signal GC may be applied to the gate electrode of the first pixel compensation transistor T3A. Since the first pixel compensation transistor T3A is turned on when the compensation gate signal GC is at the active level, a threshold voltage of the first pixel driving transistor T1A may be compensated through the first pixel compensation transistor T3A.

A part of the turn-on voltage period of the data initialization gate signal GI and a part of the turn-on voltage period of the compensation gate signal GC may overlap each other. When the part of the turn-on voltage period of the data initialization gate signal GI and the part of the turn-on voltage period of the compensation gate signal GC overlap each other (i.e., when the data initialization gate signal GI and the compensation gate signal GC are simultaneously at the active level), the initialization operation of the gate electrode of the first pixel driving transistor T1A may be performed. When the data initialization gate signal GI and the compensation gate signal GC are simultaneously at the active level, the first pixel compensation transistor T3A and the first pixel initialization transistor T4A may be turned on, and the initialization voltage VINT may be applied to the gate electrode of the first pixel driving transistor T1A through the first pixel compensation transistor T3A and the first pixel initialization transistor T4A.

The data write gate signal GW may be applied to the gate electrode of the first pixel write transistor T2A. When the data write gate signal GW is at the active level, the first pixel write transistor T2A may be turned on, and the first pixel data voltage VDATA may be applied to the first pixel second node N2A through the first pixel write transistor T2A.

The anode initialization gate signal GB may be applied to a gate electrode of the first anode initialization transistor T7. When the anode initialization gate signal GB is the active level, the first anode initialization transistor T7 may be turned on, and the anode initialization voltage VAINT may be applied to the anode electrode of the first pixel light emitting element EEA through the first anode initialization transistor T7.

In an embodiment, as shown in FIG. 8, when the self-scan operation is performed, each of the data write gate signal GW, the anode initialization gate signal, and the emission signal may include at least one turn-on voltage period, and each of the data write gate signal and the compensation gate signal may not include the turn-on voltage period.

Since the data write gate signal GW and the anode initialization gate signal GB have two active pulses, the data writing operation and the initialization operation of the anode electrode of the first pixel light emitting element EEA may be performed twice. In FIG. 8, the data write gate signal GW and the anode initialization gate signal GB are illustrated as having two active pulses, but the disclosure is not limited thereto. Alternatively, the data write gate signal GW and the anode initialization gate signal GB may have one active pulse or three or more active pulses.

Since FIG. 8 illustrates the self-scan period, the data initialization gate signal GI, the compensation gate signal GC, and the data write gate signal GW may have an inactive level in FIG. 8. For example, the inactive level of the data initialization gate signal GI and the compensation gate signal GC may be a low level, and the inactive level of the data write gate signal GW may be a high level.

The anode initialization gate signal GB may have an active level. When the anode initialization gate signal GB is the active level, the first anode initialization transistor T7 may be turned on, and the anode initialization voltage VAINT may be applied to the anode electrode of the first pixel light emitting element EEA through the first anode initialization transistor T7.

In an embodiment, as described above, the display panel 100 may include the first display region DR[1] to the N-th display region DR[N] disposed in a row direction, the P-th display region DR[P] may include a first pixel circuit PX including a first pixel driving transistor T1A, a first pixel initialization transistor T4A configured to receive an initialization voltage VINT, and a first pixel compensation transistor T3A configured to connect the first pixel driving transistor T1A and the first pixel initialization transistor T4A based on a compensation gate signal GC. In such an embodiment, the P-th display region DR[P] may include a first control transistor TC1[P] configured to output the high gate voltage VGH of the compensation gate signal GC and a second control transistor TC2[P] configured to output the low gate voltage VGL of the compensation gate signal GC. The first control transistor TC1[P] and the second control transistor TC2[P] may be controlled based on the P-th region control signal DRC[P]. Accordingly, the display device 10 may drive display regions disposed adjacent to each other in the row direction with different driving frequencies, respectively.

In such an embodiment, the first pixel compensation transistor T3A may be connected in series to the first pixel initialization transistor T4A. Accordingly, the display device 10 may adjust the compensation gate signal GC based on the P-th region control signal DRC[P] to drive the display regions disposed adjacent to each other in the row direction with different driving frequencies, respectively.

Figure 9:
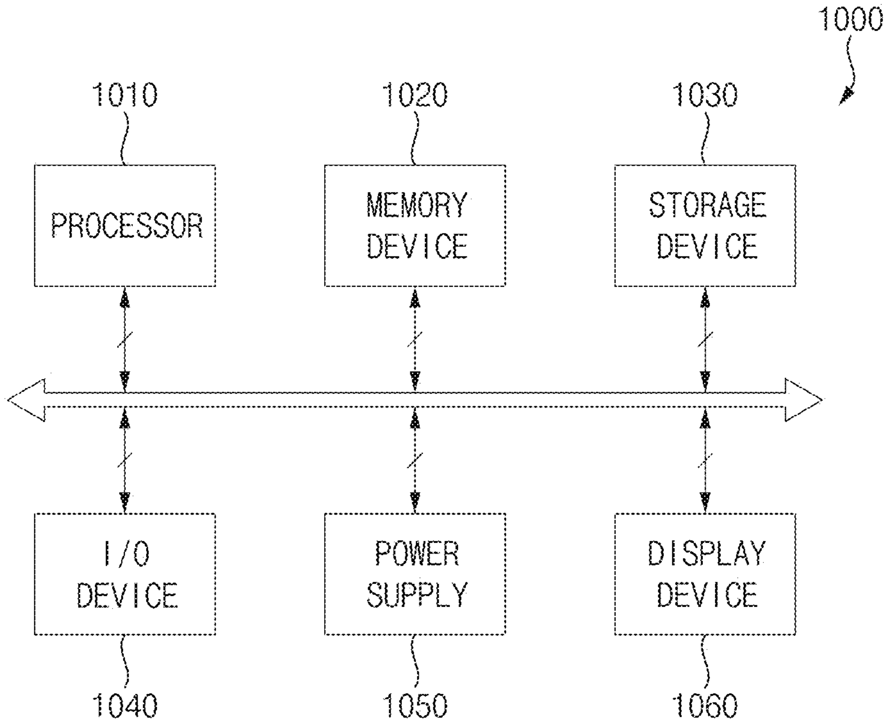
FIG. 9 is a block diagram illustrating an electronic device according to an embodiment.
Figure 10:
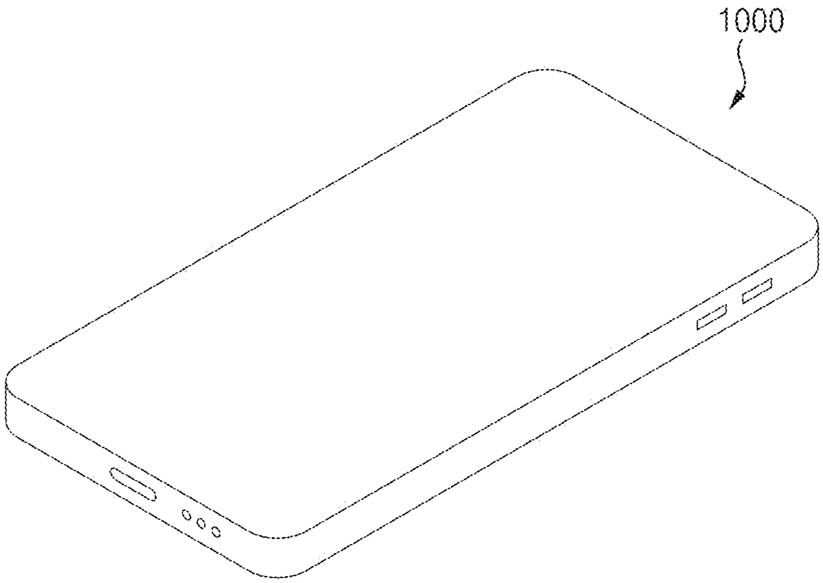
FIG. 10 is a diagram illustrating an embodiment in which the electronic device of FIG. 9 is implemented as a smart phone.

FIG. 9 is a block diagram illustrating an electronic device according to an embodiment. FIG. 10 is a diagram illustrating an embodiment in which the electronic device of FIG. 9 is implemented as a smart phone.

Referring to FIGS. 9 and 10, an embodiment of an electronic device 1000 may include a processor 1010, a memory device 1020, a storage device 1030, an input/output (I/O) device 1040, a power supply 1050, and a display device 1060. The display device 1060 may be a display device 10 in FIG. 1. In addition, the electronic device 1000 may further include a plurality of ports for communicating with a video card, a sound card, a memory card, a universal serial bus (USB) device, other electronic device, or the like.

In an embodiment, as illustrated in FIG. 10, the electronic device 1000 may be implemented as a smart phone. However, the electronic device 1000 is not limited thereto. In an alternative embodiment, for example, the electronic device 1000 may be implemented as a cellular phone, a video phone, a smart pad, a smart watch, a tablet personal computer (PC), a car navigation system, a computer monitor, a laptop computer, a head mounted display (H/ID) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like, and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, and the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

Embodiments of the invention may be applied to any display device and any electronic device including the touch panel. For example, the inventions may be applied to a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel comprising:

a first display region to an N-th display region disposed in a row direction, wherein N is an integer of 2 or greater, wherein a P-th display region, where P is an integer between 1 and N, includes:

a first pixel circuit including a first pixel driving transistor, a first pixel initialization transistor which receives an initialization voltage, and a first pixel compensation transistor connected in series to the first pixel initialization transistor, where the first pixel compensation transistor connects the first pixel driving transistor and the first pixel initialization transistor to each other based on a compensation gate signal; and a P-th region control circuit which outputs the compensation gate signal to the first pixel compensation transistor, wherein the P-th region control circuit includes a first control transistor which outputs a high gate voltage of the compensation gate signal, and a second control transistor which outputs a low gate voltage of the compensation gate signal, wherein the first control transistor and the second control transistor are controlled based on a P-th region control signal.

2. The display panel of claim 1, wherein the first control transistor includes a gate electrode which receives the P-th region control signal, a first electrode which receives the high gate voltage, and a second electrode connected to a gate electrode of the first pixel compensation transistor, and the second control transistor includes a gate electrode which receives the P-th region control signal, a first electrode which receives the low gate voltage and a second electrode connected to the gate electrode of the first pixel compensation transistor.

3. The display panel of claim 1, wherein the P-th display region further includes a second pixel circuit, wherein the second pixel circuit is disposed adjacent to the first pixel circuit in a same pixel row, and includes a second pixel driving transistor, a second pixel initialization transistor which receives the initialization voltage, and a second pixel compensation transistor connected in series to the second pixel initialization transistor, wherein the second pixel compensation transistor connects the second pixel driving transistor and the second pixel initialization transistor to each other based on the compensation gate signal.

4. The display panel of claim 3, wherein the first control transistor includes a gate electrode which receives the P-th region control signal, a first electrode which receives the high gate voltage, and a second electrode connected to a gate electrode of the first pixel compensation transistor and a gate electrode of the second pixel compensation transistor, and the second control transistor includes a gate electrode which receives the P-th region control signal, a first electrode which receives the low gate voltage and a second electrode connected to the gate electrode of the first pixel compensating transistor and the gate electrode of the second pixel compensating transistor.

5. The display panel of claim 1, wherein a data writing operation is performed one time and a self-scan operation is performed one time during a frame period when a driving frequency of the display panel is a maximum driving frequency, and the data writing operation is performed one time and the self-scan operation is performed at least two times during the frame period when the driving frequency of the display panel is not the maximum driving frequency.

6. The display panel of claim 5, wherein the first pixel circuit further includes:

a first pixel light emitting element which receives a first pixel driving current of the first pixel driving transistor;

a first pixel write transistor which applies a first pixel data voltage to a first electrode of the first pixel driving transistor;

a first pixel first light emitting transistor which transmits a first power voltage to the first electrode of the first pixel driving transistor;

a first pixel second light emitting transistor which connects a second electrode of the first pixel driving transistor to an anode electrode of the first pixel light emitting element;

a first pixel anode initialization transistor which applies an anode initialization voltage to the anode electrode of the first pixel light emitting element;

a first pixel storage capacitor which stores a voltage of a gate electrode of the first pixel driving transistor; and a first pixel hold capacitor which stores a voltage of the first electrode of the first pixel driving transistor.

7. The display panel of claim 6, wherein the first pixel light emitting element includes the anode electrode connected to a first pixel fourth node and a cathode electrode which receives a second power voltage, the first pixel driving transistor includes the gate electrode connected to a first pixel first node, the first electrode connected to a first pixel second node, and the second electrode connected to a first pixel third node, the first pixel write transistor includes a gate electrode which receives a data write gate signal, a first electrode which receives the first pixel data voltage, and a second electrode connected to the first pixel second node, the first pixel compensation transistor includes a gate electrode which receives a compensation gate signal based on the P-th region control signal, a first electrode connected to the first pixel third node, and a second electrode connected to the first pixel first node, the first pixel initialization transistor includes a gate electrode which receives a data initialization gate signal, a first electrode which receives the initialization voltage, and a second electrode connected to the first pixel third node, the first pixel first light emitting transistor includes a gate electrode which receives an emission signal, a first electrode which receives the first power voltage, and a second electrode connected to the first pixel second node, the first pixel second light emitting transistor includes a gate electrode which receives the emission signal, a first electrode connected to the first pixel third node, and a second electrode connected to the first pixel fourth node, the first pixel anode initialization transistor includes a gate electrode which receives an anode initialization gate signal, a first electrode which receives the anode initialization voltage, and a second electrode connected to the first pixel fourth node, the first pixel storage capacitor includes a first electrode which receives the first power voltage and a second electrode connected to the first pixel first node, and the first pixel hold capacitor includes a first electrode which receives the first power voltage and a second electrode connected to the first pixel second node.

8. The display panel of claim 7, wherein the data write gate signal includes an M-th data initialization gate signal, and the anode initialization gate signal is an (M+K)-th data initialization gate signal, wherein K is an integer of 1 or greater.

9. The display panel of claim 7, wherein, when the data writing operation is performed, each of the data initialization gate signal, the compensation gate signal, the data write gate signal, the anode initialization gate signal, and the emission signal includes at least one turn-on voltage period.

10. The display panel of claim 9, wherein, when the data writing operation is performed, a part of the turn-on voltage period of the data initialization gate signal overlaps a part of the turn-on voltage period of the compensation gate signal.

11. The display panel of claim 10, wherein, when the part of the turn-on voltage period of the data initialization gate signal overlaps the part of the turn-on voltage period of the compensation gate signal, the voltage of the gate electrode of the first pixel driving transistor is initialized.

12. The display panel of claim 7, wherein, when the self-scan operation is performed, each of the data write gate signal, the anode initialization gate signal, and the emission signal includes at least one turn-on voltage period, and each of the data initialization gate signal and the compensation gate signal excludes the turn-on voltage period.

13. A display device comprising:

a display panel including a first display region to an N-th display region disposed in a row direction, wherein N is an integer of 2 or greater; and a display panel driver which drives the display panel, wherein a P-th display region, where P is an integer between 1 and N, includes:

a first pixel circuit including a first pixel driving transistor, a first pixel initialization transistor which receives an initialization voltage, and a first pixel compensation transistor connected in series to the first pixel initialization transistor, wherein the first pixel compensation transistor connects the first pixel driving transistor and the first pixel initialization transistor to each other based on a compensation gate signal; and a P-th region control circuit which outputs the compensation gate signal to the first pixel compensation transistor, wherein the P-th region control circuit includes a first control transistor which outputs a high gate voltage of the compensation gate signal, and a second control transistor which outputs a low gate voltage of the compensation gate signal, wherein the first control transistor and the second control transistor are controlled based on a P-th region control signal.

14. The display device of claim 13, wherein the first control transistor includes a gate electrode which receives the P-th region control signal, a first electrode which receives the high gate voltage, and a second electrode connected to a gate electrode of the first pixel compensation transistor, and the second control transistor includes a gate electrode which receives the P-th region control signal, a first electrode which receives the low gate voltage and a second electrode connected to the gate electrode of the first pixel compensation transistor.

15. The display device of claim 13, wherein the P-th display region further includes a second pixel circuit, wherein the second pixel circuit is disposed adjacent to the first pixel circuit in a same pixel row, and includes a second pixel driving transistor, a second pixel initialization transistor which receives the initialization voltage, and a second pixel compensation transistor connected in series to the second pixel initialization transistor, wherein the second compensation transistor connects the second pixel driving transistor and the second pixel initialization transistor to each other based on the compensation gate signal.

16. The display device of claim 15, wherein the first control transistor includes a gate electrode which receives the P-th region control signal, a first electrode which receives the high gate voltage, and a second electrode connected to a gate electrode of the first pixel compensation transistor and a gate electrode of the second pixel compensation transistor, and the second control transistor includes a gate electrode which receives the P-th region control signal, a first electrode which receives the low gate voltage and a second electrode connected to the gate electrode of the first pixel compensating transistor and the gate electrode of the second pixel compensating transistor.

17. The display device of claim 13, wherein a data writing operation is performed one time and a self-scan operation is performed one time during a frame period when a driving frequency of the display panel is a maximum driving frequency, and the data writing operation is performed one time and the self-scan operation is performed at least two times during the frame period when the driving frequency of the display panel is not the maximum driving frequency.

18. The display device of claim 17, wherein the first pixel circuit further includes:

a first pixel light emitting element which receives a first pixel driving current of the first pixel driving transistor;

a first pixel write transistor which applies a first pixel data voltage to a first electrode of the first pixel driving transistor;

a first pixel first light emitting transistor which transmits a first power voltage to the first electrode of the first pixel driving transistor;

a first pixel second light emitting transistor which connects a second electrode of the first pixel driving transistor to an anode electrode of the first pixel light emitting element;

a first pixel anode initialization transistor which applies an anode initialization voltage to the anode electrode of the first pixel light emitting element;

a first pixel storage capacitor which stores a voltage of a gate electrode of the first pixel driving transistor; and a first pixel hold capacitor which stores a voltage of the first electrode of the first pixel driving transistor.

19. The display device of claim 18, wherein the first pixel light emitting element includes the anode electrode connected to a first pixel fourth node and a cathode electrode which receives a second power voltage, the first pixel driving transistor includes the gate electrode connected to a first pixel first node, the first electrode connected to a first pixel second node, and the second electrode connected to a first pixel third node, the first pixel write transistor includes a gate electrode which receives a data write gate signal, a first electrode which receives the first pixel data voltage, and a second electrode connected to the first pixel second node, the first pixel compensation transistor includes a gate electrode which receives a compensation gate signal based on the P-th region control signal, a first electrode connected to the first pixel third node, and a second electrode connected to the first pixel first node, the first pixel initialization transistor includes a gate electrode which receives a data initialization gate signal, a first electrode which receives the initialization voltage, and a second electrode connected to the first pixel third node, the first pixel first light emitting transistor includes a gate electrode which receives an emission signal, a first electrode which receives the first power voltage, and a second electrode connected to the first pixel second node, the first pixel second light emitting transistor includes a gate electrode which receives the emission signal, a first electrode connected to the first pixel third node, and a second electrode connected to the first pixel fourth node, the first pixel anode initialization transistor includes a gate electrode which receives an anode initialization gate signal, a first electrode which receives the anode initialization voltage, and a second electrode connected to the first pixel fourth node, the first pixel storage capacitor includes a first electrode which receives the first power voltage and a second electrode connected to the first pixel first node, and the first pixel hold capacitor includes a first electrode which receives the first power voltage and a second electrode connected to the first pixel second node.

20. The display device of claim 19, wherein the data write gate signal includes an M-th data initialization gate signal, and the anode initialization gate signal includes an (M+K)-th data initialization gate signal, wherein K is an integer of 1 or greater.

21. An electronic device comprising:

a display panel including a first display region to an N-th display region disposed in a row direction, wherein N is an integer of 2 or greater; and a display panel driver which drives the display panel, wherein a P-th display region, where P is an integer between 1 and N, includes:

a first pixel circuit including a first pixel driving transistor, a first pixel initialization transistor which receives an initialization voltage, and a first pixel compensation transistor connected in series to the first pixel initialization transistor, wherein the first pixel compensation transistor connects the first pixel driving transistor and the first pixel initialization transistor to each other based on a compensation gate signal; and a P-th region control circuit which outputs the compensation gate signal to the first pixel compensation transistor, wherein the P-th region control circuit includes a first control transistor which outputs a high gate voltage of the compensation gate signal, and a second control transistor which outputs a low gate voltage of the compensation gate signal, wherein the first control transistor and the second control transistor are controlled based on a P-th region control signal.

* * * * *